United States Patent
Duong et al.

(10) Patent No.: US 10,768,037 B2
(45) Date of Patent: Sep. 8, 2020

(54) OIL LEVEL SENSOR GUIDE

(71) Applicant: United Technologies Corporation, Farmington, CT (US)

(72) Inventors: Hung Duong, Unionville, CT (US); Wesley P. Long, Glastonbury, CT (US); Jonathan Zimmitti, Glastonbury, CT (US); David A. Stachowiak, Manchester, CT (US); Lakshminarayan S. Bettagere, Farmington, CT (US); Brian V. Abedon, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 348 days.

(21) Appl. No.: 15/620,311

(22) Filed: Jun. 12, 2017

(65) Prior Publication Data

US 2018/0356272 A1 Dec. 13, 2018

(51) Int. Cl.
*G01F 23/60* (2006.01)
*G01F 23/62* (2006.01)
(Continued)

(52) U.S. Cl.
CPC .............. *G01F 23/60* (2013.01); *B60K 15/03* (2013.01); *F01D 21/003* (2013.01); *G01F 23/00* (2013.01);
(Continued)

(58) Field of Classification Search
CPC .......... G01F 23/30; G01F 23/56; G01F 23/60; G01F 23/603; G01F 23/62; G01F 23/64;
(Continued)

(56) References Cited

U.S. PATENT DOCUMENTS

| 3,859,484 A | 1/1975 | Nelson |
| 4,227,057 A | 7/1980 | Kubler |

(Continued)

FOREIGN PATENT DOCUMENTS

| CN | 202812155 | 3/2013 |
| DE | 1925660 | 11/1969 |
| DE | 202016106741 | 1/2017 |
| EP | 3115757 | 1/2017 |
| WO | WO2016193593 A1 | 12/2016 |

OTHER PUBLICATIONS

European Search Report for EP Application No. 18177404.3 dated Oct. 18, 2018.

*Primary Examiner* — Benjamin R Schmitt
(74) *Attorney, Agent, or Firm* — Getz Balich LLC (57) ABSTRACT

A fluid tank system comprises a fluid container that includes a sensor opening in a fluid container wall defined by a rim, and a fluid level sensor comprising a radial flange on a proximate end of a longitudinally extending electronics stem that includes a distal end. The distal end of the electronic stem is inserted into the fluid container via the sensor opening and the radial flange seats on the rim. The distal end of the electronics stem is guided via a first radial support and a second radial support to a seat that is located coaxial with the sensor opening, where the first and second radial supports are longitudinally separated and radially spaced apart to allow the electronics stem to longitudinally pass between the first and second radial supports until the flange seats on the rim ensuring that the distal end of the electronic stem is longitudinally positioned adjacent to the seat.

6 Claims, 14 Drawing Sheets

(51) Int. Cl.
*G01F 23/76* (2006.01)
*F01D 21/00* (2006.01)
*G01F 23/00* (2006.01)
*B60K 15/03* (2006.01)
*G01F 23/04* (2006.01)

(52) U.S. Cl.
CPC ............ *G01F 23/62* (2013.01); *G01F 23/76* (2013.01); *B60K 2015/03217* (2013.01); *B60Y 2200/51* (2013.01); *F05D 2220/32* (2013.01); *G01F 23/04* (2013.01)

(58) Field of Classification Search
CPC .......... G01F 23/68; G01F 23/70; G01F 23/72; G01F 23/76; B60K 15/03; B60K 2015/0321; B60K 2015/03217
USPC ................ 73/290 R, 305, 306, 309, 313
See application file for complete search history.

(56) References Cited

U.S. PATENT DOCUMENTS

| | | | |
|---|---|---|---|
| 4,714,176 A * | 12/1987 | Wijnen | G03D 3/06 200/84 C |
| 5,172,594 A | 12/1992 | Dyke | |
| 6,195,013 B1 * | 2/2001 | Robinson | G01F 23/74 116/228 |
| 6,412,344 B1 | 7/2002 | Danicich et al. | |
| 7,552,803 B2 | 6/2009 | Luce | |
| 7,574,912 B2 * | 8/2009 | Fling | G01F 23/0046 340/624 |
| 8,919,182 B2 | 12/2014 | Luce | |
| 9,116,029 B2 | 8/2015 | Kreitmair-Steck et al. | |
| 2005/0127924 A1 | 6/2005 | Grieshaber | |
| 2016/0202103 A1 | 7/2016 | Heinonen et al. | |

* cited by examiner

OIL LEVEL SENSOR GUIDE

BACKGROUND OF THE INVENTION

1. Technical Field

The present disclosure relates generally to fluid containers with a sensor therein to measure fluid level. More particularly, the disclosure relates to an oil tank with a sensor therein to measure oil level in the tank, for use in a gas turbine engine.

2. Background Information

During operation of a gas turbine engine oil is used to lubricate and cool rotating gears. Assembly of an oil level sensor into an oil tank located on a gas turbine engine can be a challenge when the oil level sensor is assembled in an inverted orientation (e.g., during replacement of the sensor on engine and the sensor is inserted generally vertically upward into the tank). Proper installation is required to prevent assembly damage to surrounding parts and the sensor itself. In addition, it is essential that the oil level sensor is installed correctly because sealing surfaces on the oil tank must adhere to tight tolerances to avoid leaks.

It would be desirable to reduce the chance of oil level sensor misassembly and reduce oil sensor removal and replacement time.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a fluid tank system. The fluid tank system comprises a fluid container that includes a sensor opening in a fluid container wall defined by a rim. The fluid tank system may also comprise a fluid level sensor comprising a radial flange on a proximate end of a longitudinally extending electronics stem that includes a distal end. The fluid tank system may further comprise a longitudinally extending assembly tooling element that this inserted into an assembly tool bore of the fluid container wall, where, as the longitudinally extending electronics stem passes through the sensor opening the assembly tooling element passes through a guide aperture in the radial flange ensuring that the distal end of the electronics stem is co-axially aligned and positioned with respect to the seat.

The fluid level sensor may comprise a float that co-axially surrounds the electronics stem.

The fluid level sensor may comprise a magnetic reed switch sensor where the float comprises a permanent magnet.

According to another aspect of the present disclosure, a fluid tank assembly is provided. The fluid tank assembly may include a fluid container that includes a sensor opening in a fluid container wall defined by a rim. The fluid tank assembly may further comprise a fluid level sensor comprising a radial flange on a proximate end of a longitudinally extending electronics stem that includes a distal end. The distal end of the electronics stem may be inserted into the fluid container via the sensor opening and the radial flange seats on the rim that forms the sensor opening, and the distal end of the electronics stem is guided to a seat that is located coaxial with the sensor opening via a support that extends longitudinally inward to the fluid container from the fluid container wall, where the electronics stem slides along the support until the radial flange seats on the rim ensuring that the distal end of the electronic stem is longitudinally positioned adjacent to the seat.

The support includes a first face surface that is concave and along which the stem slides during insertion into the fluid container.

The fluid level sensor may comprise a float that co-axially surrounds the electronics stem.

According to another aspect of the present disclosure, a fluid tank assembly is provided. The fluid tank assembly may comprise a fluid container that includes a sensor opening in a fluid container wall defined by a rim. The fluid tank assembly may further comprise a fluid level sensor comprising a radial flange on a proximate end of a longitudinally extending electronics stem that includes a distal end. The distal end of the electronic stem may be inserted into the fluid container via the sensor opening and the radial flange seats on the rim, and the distal end of the electronics stem is guided via a first radial support and a second radial support to a seat that is located coaxial with the sensor opening, where the first and second radial supports are longitudinally separated and radially spaced apart to allow the electronics stem to longitudinally pass between the first and second radial supports until the flange seats on the rim ensuring that the distal end of the electronic stem is longitudinally positioned adjacent to the seat.

The first radial support and the second radial support may be unitary with the fluid container wall.

The first radial support and the second radial support may be fastened to an interior side of the fluid container wall.

According to another aspect of the present disclosure, a fluid tank assembly is provided. The fluid tank assembly may comprise a fluid container that includes a sensor opening in a fluid container wall defined by a rim. The fluid tank assembly may further comprise a fluid level sensor comprising a radial flange on a proximate end of a longitudinally extending electronics stem that includes a distal end. The distal end of the electronics stem may be inserted into the fluid container via the sensor opening that includes complex curved interior side walls extending inward to an interior of the fluid container, where the complex curved shape of the interior side walls allows the electronics stem to axially pass through the sensor opening to radially position the distal end of such that when the radial flange seats on the rim the distal end axially and radially positioned in the seat.

According to another aspect of the present disclosure, a fluid tank assembly is provided. The fluid tank assembly may comprise a fluid container that includes a sensor opening in a fluid container wall defined by a rim. The fluid tank assembly may also comprise a fluid level sensor comprising a radial flange on a proximate end of a longitudinally extending electronics stem that includes a distal end. The distal end of the electronics stem may be inserted into the fluid container via the sensor opening and as the distal end of the electronic stem reaches a first axial position and passes deeper into the fluid container an O-ring housing radially surrounding and attached to the electronics stem pushes radially outward a spring assembly that radially surrounds the electronics stem and the O-ring housing, and as the O-ring housing continues deeper into the fluid container and reaches a second axial position the spring assembly moves radially inward applying a radial aligning force to the electronics stem such that when the flange seats on the rim the distal end of electronics stem is axially and radial positioned in the seat.

The spring assembly partially radially surrounds the electronics stem and the O-ring housing.

The spring assembly continuously radially surrounds the electronics stem and the O-ring housing.

The spring assembly may comprise a first plurality of springs each longitudinally separated in an axial direction.

The spring assembly may comprise a second plurality of springs each longitudinally separated in an axial direction, where the first and second plurality of springs are radially opposing with respect to the longitudinally extending electronics stem.

The fluid level sensor may comprise a float that co-axially surrounds the electronics stem.

The fluid level sensor may comprise a magnetic reed switch sensor where the float comprises a permanent magnet.

According to another aspect of the present disclosure, a fluid tank assembly is provided. The fluid tank assembly may comprise a fluid container that includes a sensor opening in a fluid container wall defined by a rim. The fluid tank assembly may further comprise a fluid level sensor comprising a radial flange on a proximate end of a longitudinally extending electronics stem that includes a distal end. The fluid tank assembly may also comprise a guide tube that radially surrounds the electronics stem and axially contacts a flanged surface of the longitudinally extending electronics stem located within the fluid surface, where the longitudinally extending electronics stem, the guide tube and the sensor opening are co-axial about a central axis.

The guide tube may free float about the longitudinally extending electronics stem.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 1:
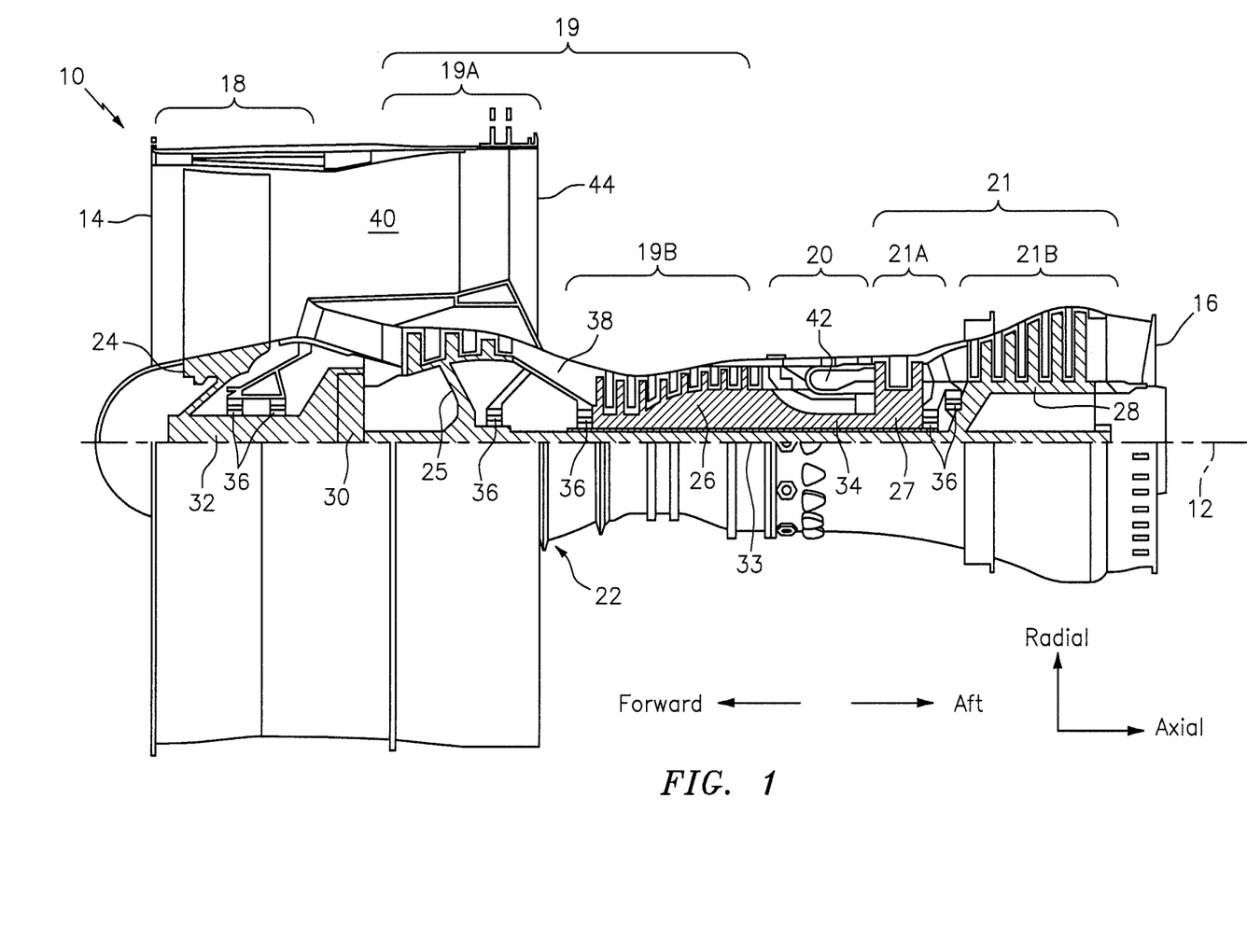
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2:
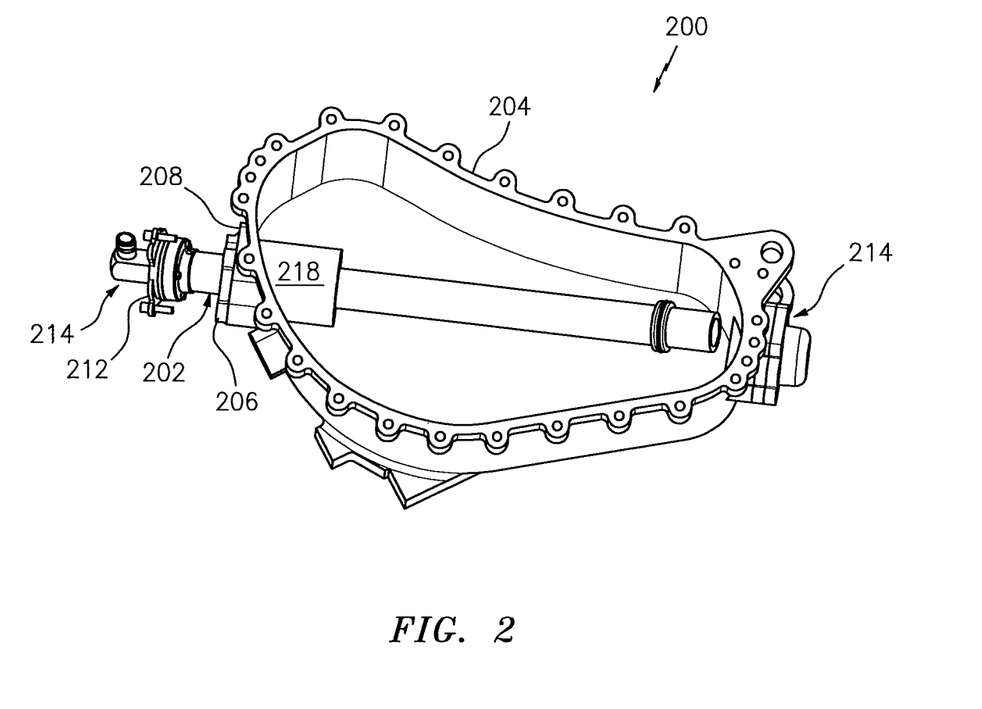
FIG. 2 is a simplified illustration of the interior of a split case oil tank that includes an oil level sensor.

FIG. 2 is a simplified illustration of the interior of a split case fluid tank 200 (e.g., a gas turbine engine mounted oil tank) that includes a fluid level sensor 202. The split case tank include a first case 204 and a complementary second case (not shown) that when secured together form a fluid vessel. The tank 200 includes a sensor opening 206 formed in a first wall 208 of the first case 204. To sense the level of fluid in the tank, the tank includes the sensor 202 that provides a signal indicative of level of fluid in the tank. The sensor 202 may include an electronic stem 210 that longitudinally extends into the tank via the sensor opening 206 in the first wall 208. The fluid sensor 202 comprises a radial flange 212 located adjacent to a proximate end 214 of the longitudinally extending electronic stem, which also includes a distal end 216. The sensor also includes a guide tube 218 that radially surrounds the stem.

When the distal end 216 of the electronic stem is inserted into the tank via the sensor opening 206, the guide tube 218 radially aligns the distal end 216 with a distal end receiver 220. The longitudinal length of the guide tube 218 is selected based upon the length of the tank that the distal end 216 has to traverse. For example, the longer the distance to traverse the longer the guide 218 should be to ensure the distal end 216 is in radial alignment with the distal end receiver 220 when the flange 212 seats on a rim of the sensor opening 206.

Figure 3:
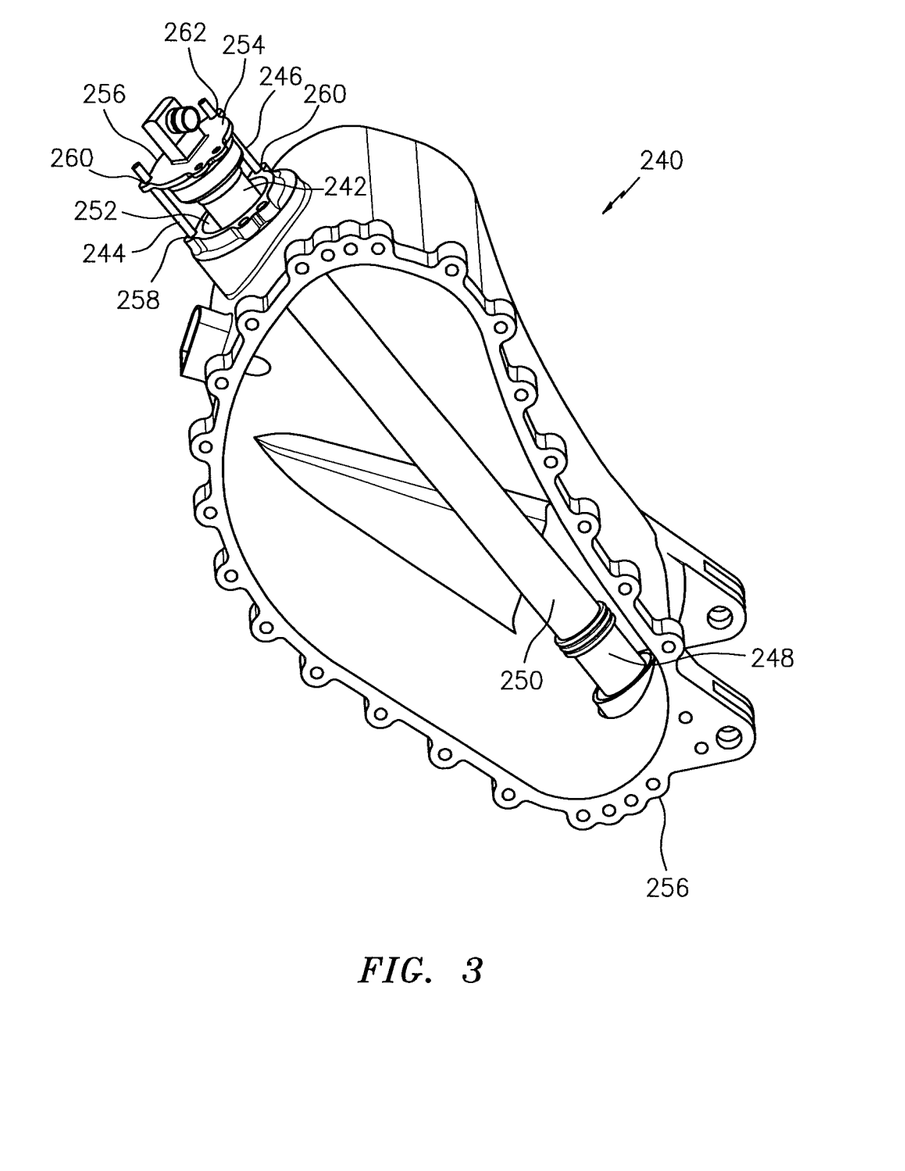
FIG. 3 is a simplified illustration of the interior of a split case oil tank that includes an oil level sensor and assembly tooling guide pins used for assembly of the sensor in the tank.

FIG. 3 is a simplified illustration of the interior of a split case oil tank 240 that includes an oil sensor 242 and assembly tooling guide pins 244, 246 used for placement and assembly of the sensor 242 in the tank. In this embodiment, distal end 248 of sensor electronic stem 250 is inserted into the fluid tank via sensor opening 252 in a tank wall and flange 254 seats on a rim 256 of the tank that forms the sensor opening 252. In this embodiment the distal end of the electronics stem is guided to a seat 256 located coaxial to the sensor opening 252.

During assembly of the sensor into the tank, the assembly tooling guide pins 244, 246 are inserted into assembly tool bores 258, 260 in the rim. As the longitudinally extending electronic stem 250 passes through the sensor opening 252 the assembly tooling guide pins 244, 246 pass through apertures 261, 262, respectively, of the flange 254, ensuring that the distal end 248 of the electronic stem is aligned and positioned with respect to the seat 256. Once the flange 254 is seated on the rim (e.g., via a gasket), then the assembly tooling guide pins 244, 246 are moved, and fasteners (not shown) are inserted into the assembly tool bores 258, 260 to secure the flange 254 to the rim 256.

Figure 4A:
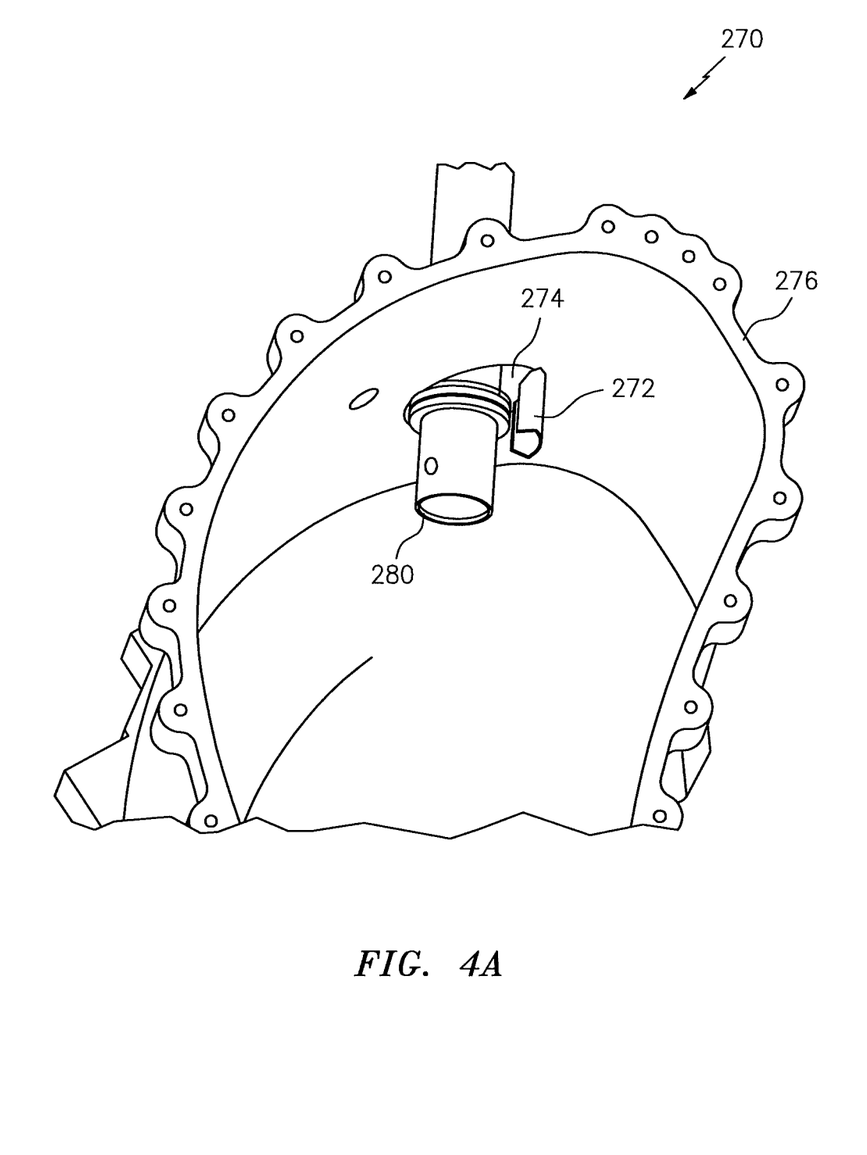
FIG. 4A is a simplified illustration of a portion of the interior of a split case oil tank that includes a guide partially surrounding a sensor opening in the oil tank case.

In another embodiment for operably positioning the sensor in the tank, FIG. 4A is a simplified illustration of a portion of the interior of a split case fluid tank 270 that includes a guide 272 partially surrounding a sensor opening 274 in tank case 276. The guide 272 may be secured to the tank case 276 and extends longitudinally inward a sufficient distance to guide sensor stem 278 in order to align sensor distal end 280 with distal end receiver (not shown in FIG. 4A). The guide 272 may also be a unitary component of the tank case 276. The length of the guide 272 is dependent on the length of the tank (e.g., distance between sensor opening 274 and distal end receiver).

Figure 4B:
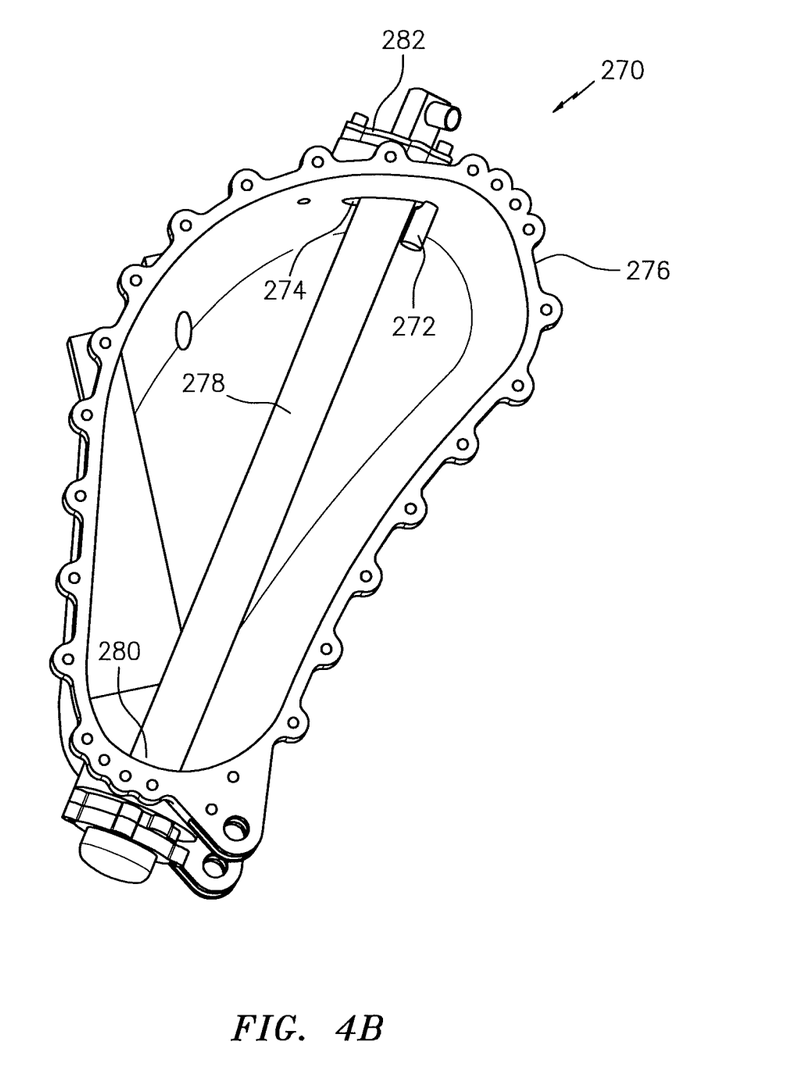
FIG. 4B illustrates the interior of the split case oil tank of FIG. 4A with the sensor operatively positioned within the tank.

FIG. 4B illustrates the interior of the split oil tank 270 of FIG. 4A with the sensor stem 278 operatively positioned within the tank, with a flange 282 of the sensor secured to a rim of the tank (e.g., with a gasket between).

Figure 5A:
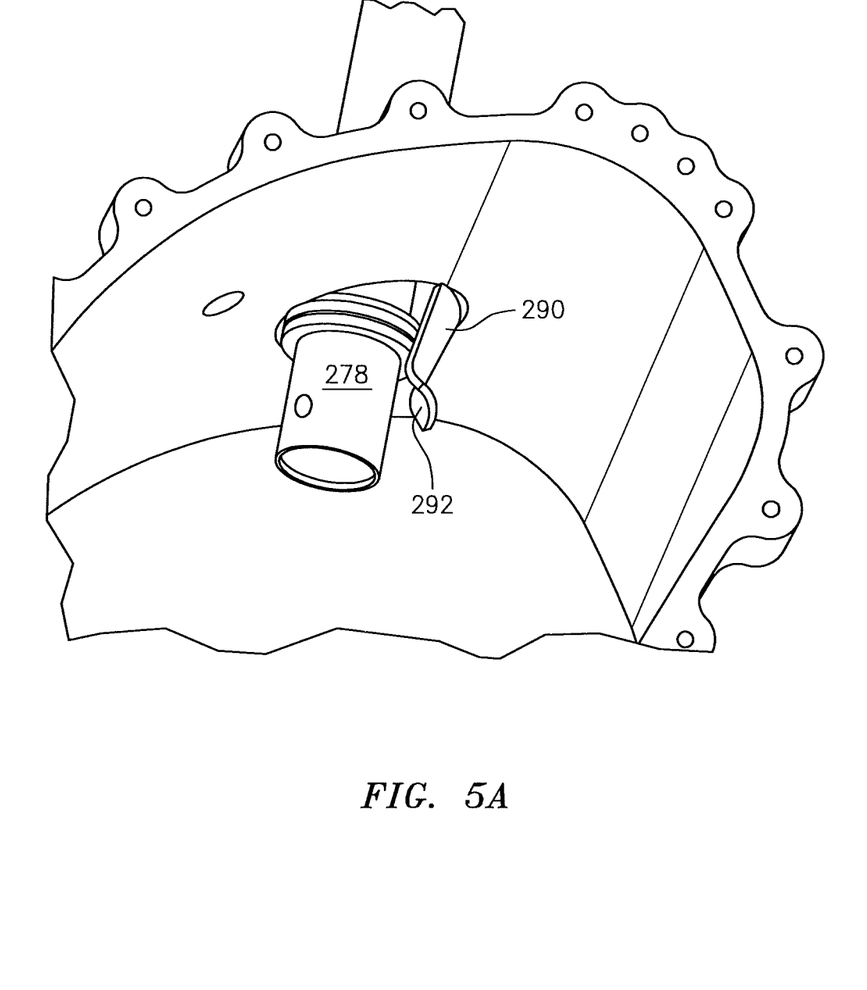
FIG. 5A is a simplified illustration of a portion of the interior of a split case oil tank that includes an alternative embodiment guide partially surrounding a sensor opening in the oil tank case.

FIG. 5A is a simplified illustration of a portion of the interior of the split case oil tank of FIGS. 4A and 4B. The embodiment in FIG. 5A is substantially the same as the embodiments in FIGS. 4A and 4B with the principal exception that guide 290 has a substantially concave surface 292 radially facing the sensor stem 278, such that as the stem is inserted into the tank the guide 290 aligns the distal end of the stem with the distal end receiver inside the tank. The guide 290 may apply a slight spring force radially against the sensor stem 278 to position the stem during assembly.

Figure 5B:
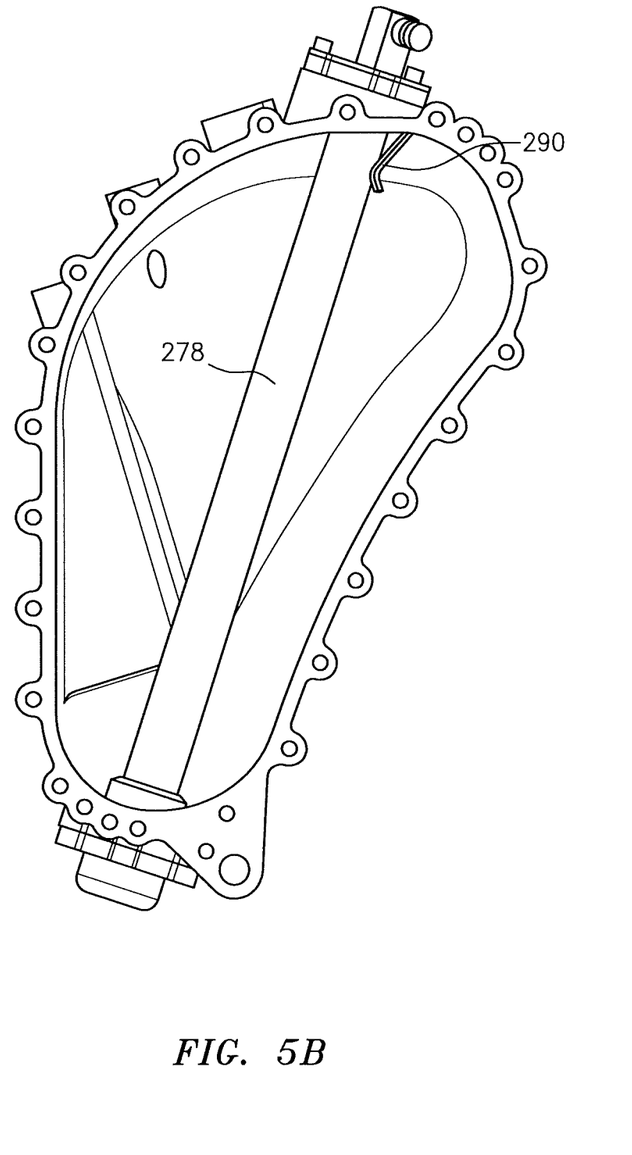
FIG. 5B illustrates the interior of the split case oil tank of FIG. 5A with the sensor operatively positioned within the tank.

FIG. 5B illustrates the interior of the split case oil tank of FIG. 5A with the sensor operatively positioned within the tank.

Figure 6:
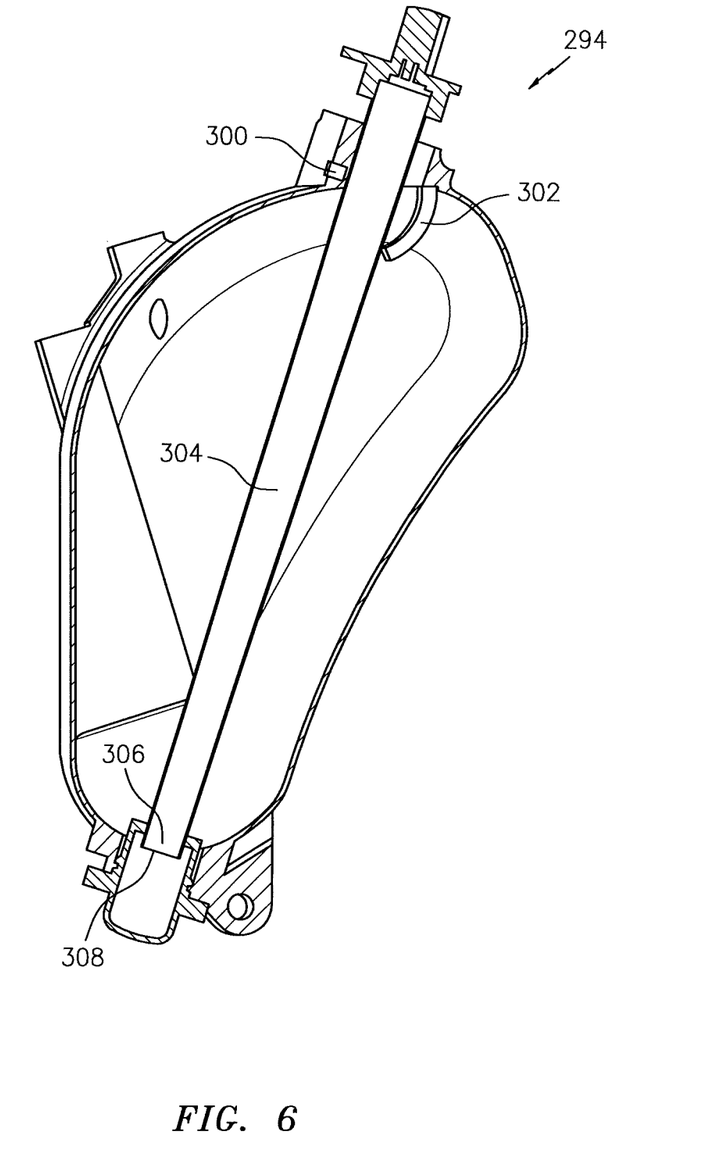
FIG. 6 is a simplified illustration of the interior of a split case oil tank that includes a first radial support and a second radial support, where the first and second radial supports are axially and radially spaced apart to allow an electronic stem of the oil level sensor to axially pass between the first and second radial supports ensuring that the distal end of the electronic stem is longitudinally positioned adjacent to the distal end seat.

FIG. 6 is a simplified illustration of the interior of a split case fluid tank 294 that includes a first radial support 300 and a second radial support 302, where the first and second radial supports 300, 302 are axially (i.e., longitudinally) separated and radially spaced apart to allow sensor stem 304 to axially pass between the first and second radial supports. The supports 300, 302 cooperate to ensure distal end 306 of the electronic stem is longitudinally positioned adjacent to a distal end seat 308.

Figure 7A:
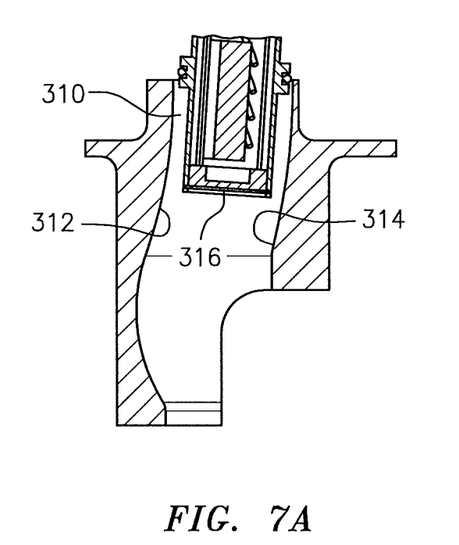
FIGS. 7A-7C are cross sectional illustrations of a portion of the length of a sensor opening in a fluid tank sidewall that includes complex curved interior side walls and a distal end on the sensor progressively moving through the length of the sensor opening.
Figure 7B:
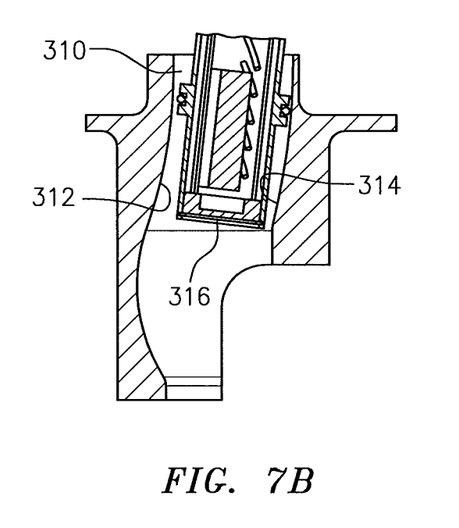
Figure 7C:
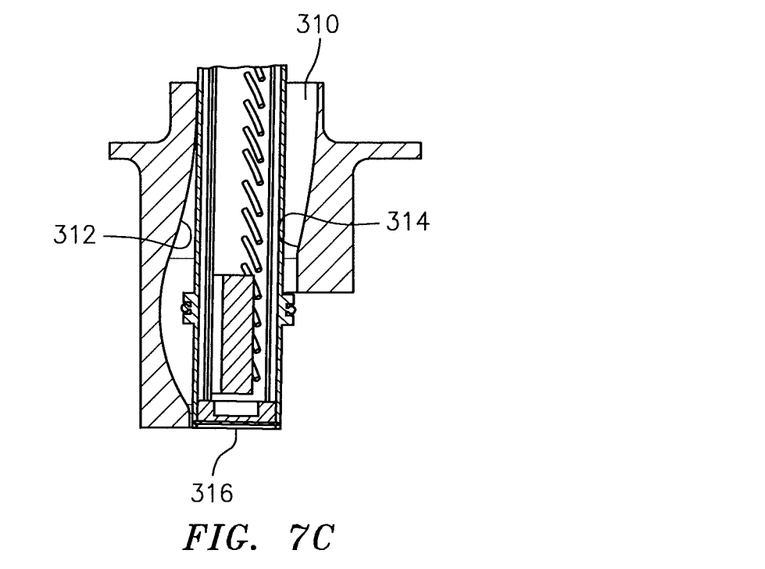

In yet another embodiment, FIGS. 7A-7C are a series of cross sectional illustrations of a portion of the length of a sensor opening 310 in a fluid tank sidewall. The sensor opening 310 comprises complex curved interior sidewalls 312, 314. As a distal end 316 of a fluid level sensor progressively moves through the length of the sensor opening 310, the complex curved interior sidewalls 312, 314 cooperate to properly align the distal end 316.

Figure 8:
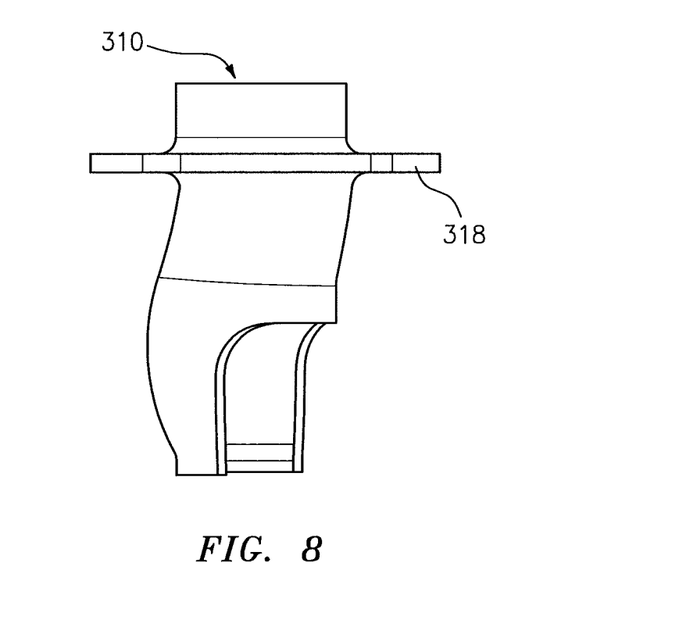
FIG. 8 is a pictorial illustration of the portion of the length of the sensor opening illustrated in FIGS. 7A-7C, including a flange that seats on an exterior surface of the fluid tank.

FIG. 8 is a pictorial illustration of the portion of the length of a sensor opening illustrated in FIGS. 7A-7C, including a flange 318.

FIGS. 9A-9D are a series of cross sectional illustrations of a portion of the length of a sensor opening in a fluid tank sidewall 340 that includes a spring holder 342 positioned co-axially along a central axis 343 with respect to a sensor opening 344 in the fluid tank sidewall 340. The spring holder 342 extends axially inward from the tank sidewall 340 and includes a plurality of springs 348-353 (e.g., coiled springs). The interior opening formed by the spring holder 342 may be co-axial with the sensor opening 344 about the axis 343. A first set 348-350 of the plurality of springs may be spaced apart axially, and on an opposite radial side of the spring holder 342 a second set 351-353 of the plurality of springs may also be spaced apart axially. The first set 348-350 and the second set 351-353 of the plurality of springs may be radially opposing with respect to the axis 343.

Figure 9A:
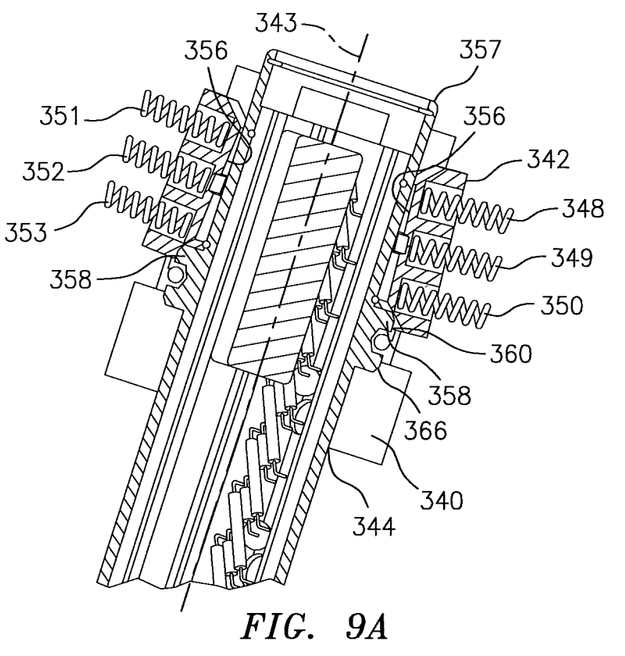
FIGS. 9A-9D are cross sectional illustrations of a portion of the length of a sensor opening in a fluid tank sidewall that includes an O-ring housing surrounding the electronic stem progressively pushing open a spring assembly, which radially surrounds the electronic stem as the distal end of the electronic stem continues deeper into the fluid container until it reaches a second position, and the spring assembly closes applying a radial aligning force to the electronic stem such that when the flange seats on the rim the distal end of electronic stem is axially and radially positioned in the seat.

The spring holder 342 may include a radially interior surface 356 that each of the springs applies a radial force to. In the interest of ease of illustration the radial exterior surface that the springs contact is not shown. Referring to FIG. 9A, as distal end 357 of the sensor stem passes axially further into the fluid tank through the sensor opening 344, an O-ring projection 358 of the level sensor electronic stem contacts a tapered distal end surface 360 of the spring holder 342. As the distal end 357 and the O-ring projection 358 move axially inward the O-ring projection 358 displaces the radially interior surface 356 radially outward against spring forces. The radially opposing springs apply forces to the radial interior surface 356 that align the distal end 357 of the fluid level sensor with a stem receiver (not shown) located at a distal end of the fluid tank. The axial and radial arrangement of the plurality of springs 348-353 and the resultant forces applied by the radial interior surface 356 against the sensor stem properly aligns the distal end 357 with the cooperating stem receiver located at a distal end of the fluid tank coaxial with the sensor opening.

Figure 9B:
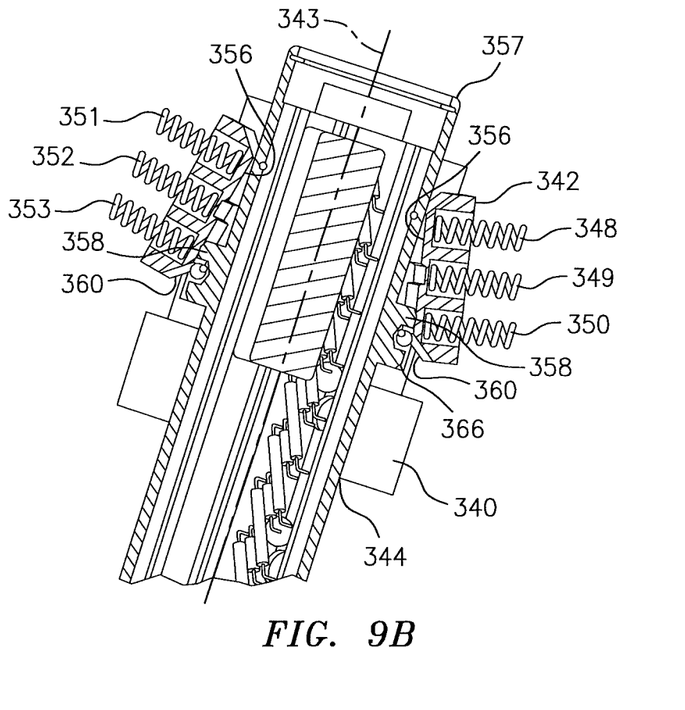
Figures 9C, 9D:
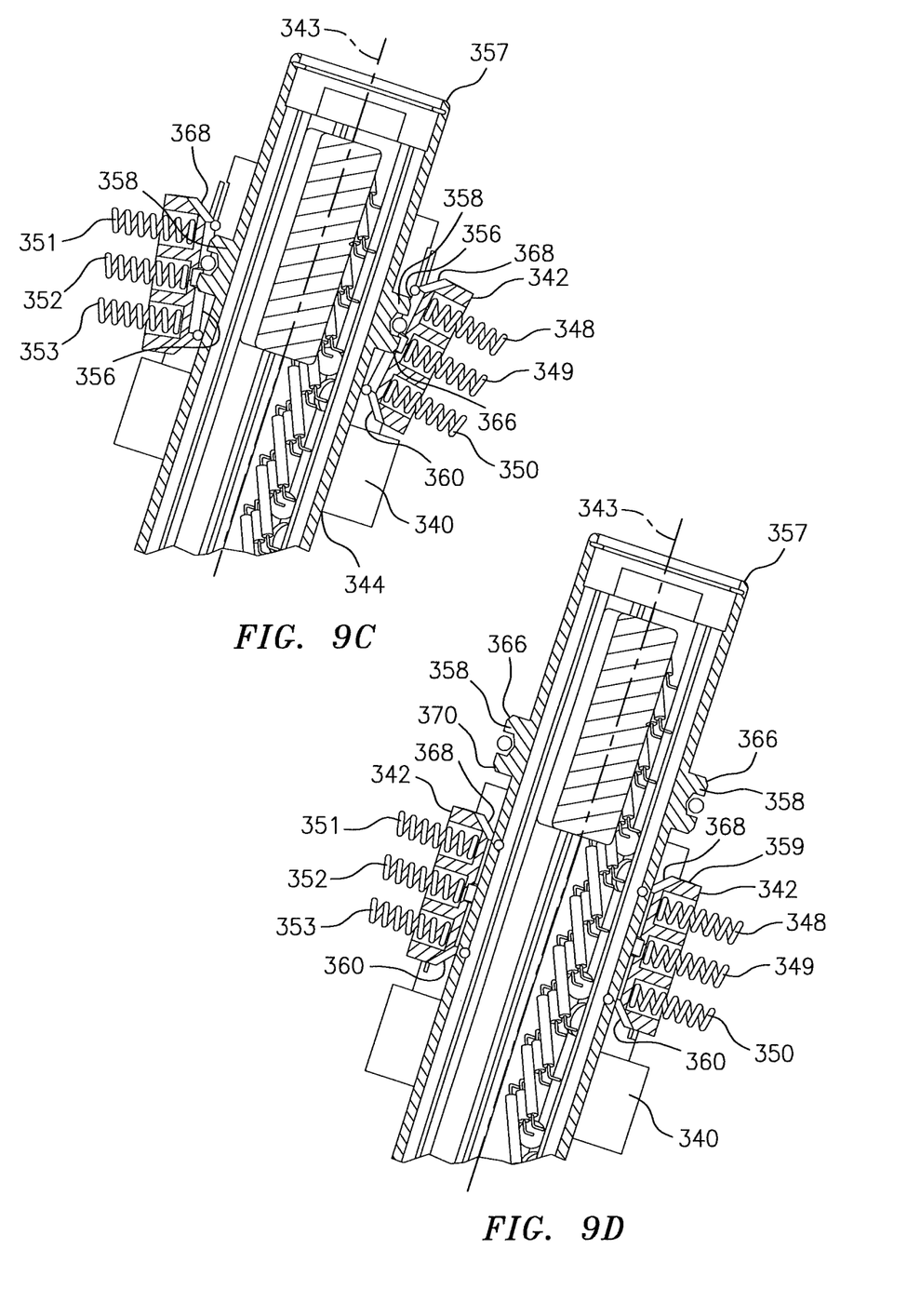

Referring now to FIG. 9B, as the O-ring projection 358 moves further axially inward the radial interior surface 356 is radially displaced. In FIG. 9C the O-ring projection 358 is even further axially inward in comparison to FIG. 9B, and the projection 358 displaces a distal end of the surface 356. In FIG. 9D, the O-ring projection 358 has passed axially inward beyond a distal end 359 of the surface 356 allowing the surface 356 to contact and align the stem. That is, as shown in FIG. 9D the radially interior surface 356 applies opposing radial force against the sensor stem to align the distal end 357 with the stem receiver.

It is contemplated that the radially interior surface 356 may be a single surface that surrounds an area co-axial with the sensor opening 344, or the radially interior surface 356 may comprise a plurality of surfaces that surrounds the area co-axial with the sensor opening 344. In either embodiment the interior surface(s) align the distal end 357 of the sensor stem to ensure proper installation on the level sensor. A tapered distal end 360 of the O-ring projection 358 may be used to allow the O-ring projection 358 to smoothly engage the spring holder 342.

To assist with removal of the sensor from the tank, the spring holder 342 includes a tapered proximate end surface 368, which is smoothly contacted by the tapered surface 370 of the O-ring projection as the fluid level sensor is being removed from the tank.

Figure 10:
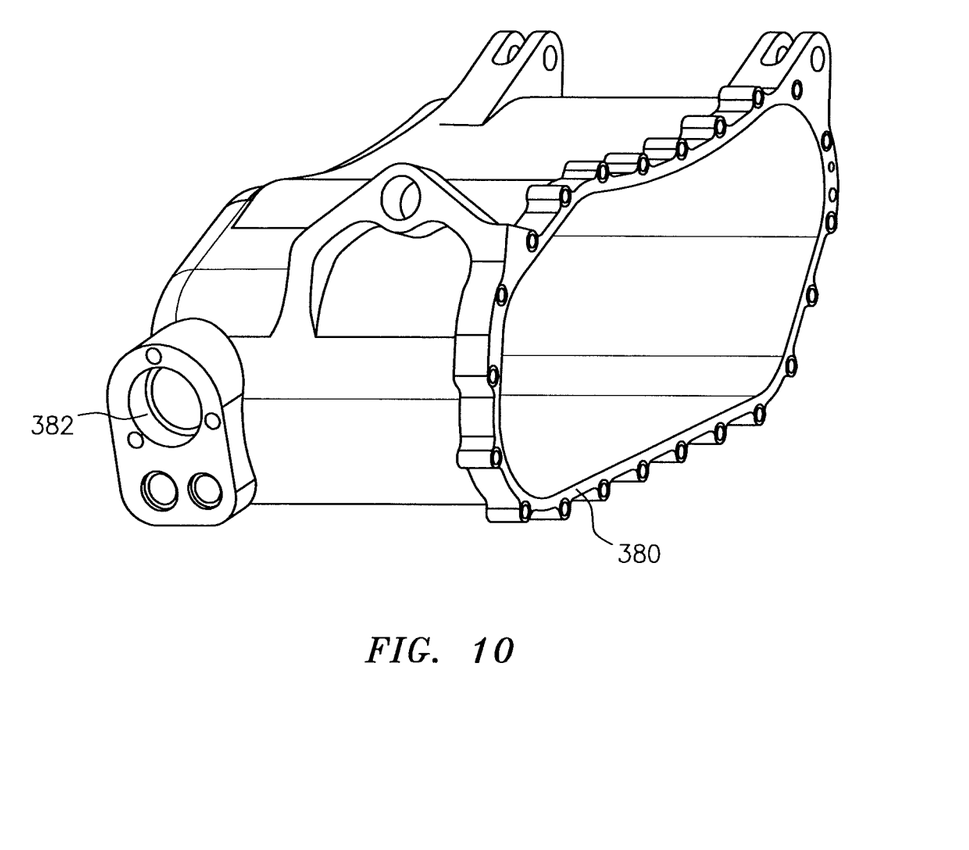
FIG. 10 is a perspective view of a first case of a split case fluid tank.

FIG. 10 is a perspective view of a first case 380 of a split case fluid tank. The first case 380 may be a unitary component that is cast, machined or additively manufactured. The first case 380 includes a fluid level sensor opening 382.

Figure 11:
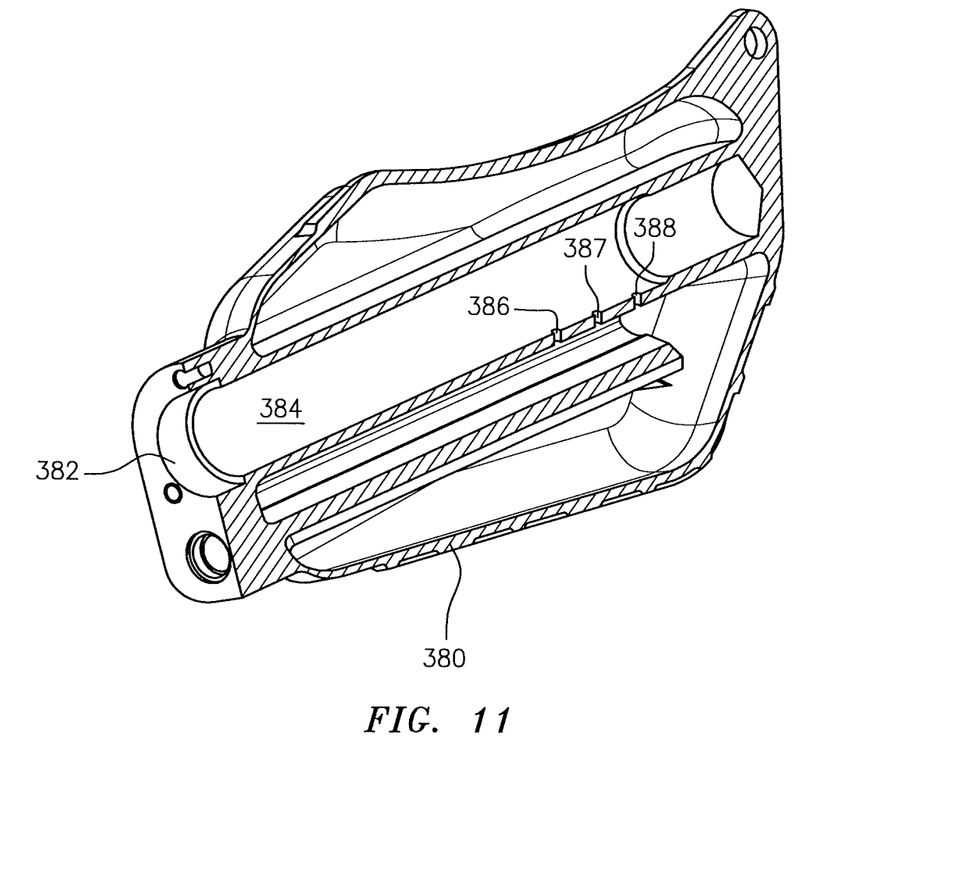
FIG. 11 is a cross sectional illustration of a portion of the split case fluid tank of FIG. 11 illustrating an integral oil sensor guide.

FIG. 11 is a cross sectional illustration of a portion of the first case 380 of FIG. 10 illustrating an integral oil sensor guide 384 that includes a plurality of fluid leak holes 386-388 that allow fluid to enter the sensor guide and contact the sensor therein in order to sense the fluid level. In this embodiment the guide 384 radially surrounds the sensor stem that would be inserted via the sensor opening 382

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A fluid tank system, comprising:
a fluid container that includes a sensor opening in a fluid container wall defined by a rim;
a fluid level sensor comprising a radial flange on a proximate end of a longitudinally extending electronics stem that includes a distal end;
where the distal end of the electronics stem is inserted into the fluid container via the sensor opening and the radial flange seats on the rim that forms the sensor opening, and the distal end of the electronics stem is guided to a seat that is located coaxial with the sensor opening via a support that extends longitudinally inward to the fluid container from the fluid container wall, where the electronics stem slides along the support until the radial flange seats on the rim ensuring that the distal end of the electronic stem is longitudinally positioned adjacent to the seat;
where the support partially surrounds the sensor opening by extending around only a portion of a circumference of the sensor opening.

2. The fluid tank system of claim 1, where the support includes a first face surface that is concave and along which the stem slides during insertion into the fluid container.

3. The fluid tank system of claim 2, wherein the support comprises a first end in contact with the container wall a second end longitudinally opposite the first end, and a bend located longitudinally between the first end and the second end, the bend located radially inward of the first end and the second end.

4. The fluid tank system of claim 3, wherein the support extends radially inward from the first end to the bend and radially outward from the bend to the second end.

5. The fluid tank system of claim 1, wherein the support comprises a first end in contact with the container wall a second end longitudinally opposite the first end, wherein the support comprises a first face surface that is concave and faces the stem and a second face surface that is convex and faces away from the stem, and wherein the support comprises first and second edges which extend longitudinally between the first end and the second end.

6. The fluid tank system of claim 5, wherein the first and second edges face the stem.

* * * * *